US010207445B2

(12) United States Patent
Janszen

(10) Patent No.: US 10,207,445 B2
(45) Date of Patent: Feb. 19, 2019

(54) EXTRUDER TOOLING

(71) Applicant: VMI HOLLAND B.V., Epe (NL)

(72) Inventor: Cornelis Wouteres Janszen, Harderwijk (NL)

(73) Assignee: VMI HOLLAND B.V., Epe (NL)

( * ) Notice: Subject to any disclaimer, the term of this patent is extended or adjusted under 35 U.S.C. 154(b) by 270 days.

(21) Appl. No.: 15/108,836

(22) PCT Filed: Dec. 30, 2014

(86) PCT No.: PCT/NL2014/050918
§ 371 (c)(1),
(2) Date: Jun. 29, 2016

(87) PCT Pub. No.: WO2015/105413
PCT Pub. Date: Jul. 16, 2015

(65) Prior Publication Data
US 2016/0325478 A1    Nov. 10, 2016

(30) Foreign Application Priority Data

Jan. 10, 2014 (NL) .................................... 2012075

(51) Int. Cl.
*B29C 47/70* (2006.01)
*B29C 47/00* (2006.01)
(Continued)

(52) U.S. Cl.
CPC ........ *B29C 47/705* (2013.01); *B29C 47/0019* (2013.01); *B29C 47/027* (2013.01);
(Continued)

(58) Field of Classification Search
CPC ..... B29C 47/02; B29C 47/027; B29C 47/145; B29C 47/065; B29C 47/705; B29C 47/0019; B29C 47/0021; B60C 9/22
(Continued)

(56) References Cited

U.S. PATENT DOCUMENTS

| 3,888,713 A | 6/1975 | Alderfer | |
| 4,948,354 A * | 8/1990 | Minaudo | B29C 47/0021 425/114 |
| 2010/0283173 A1* | 11/2010 | Kenny | B29C 47/027 264/101 |

FOREIGN PATENT DOCUMENTS

| EP | 0 339 510 A2 | 11/1989 |
| EP | 0 503 541 A1 | 9/1992 |

(Continued)

OTHER PUBLICATIONS

International Search Report issued in PCT/NL2014/050918 dated Mar. 18, 2015 (5 pages).
(Continued)

*Primary Examiner* — Seyed Masoud Malekzadeh
*Assistant Examiner* — Lawrence D. Hohenbrink, Jr.
(74) *Attorney, Agent, or Firm* — RatnerPrestia

(57) ABSTRACT

The invention relates to an extruder tooling for placement in an extruder head and for forming an elastomeric strip with reinforcement cords, wherein the extruder tooling includes a die for applying elastomeric material to the reinforcement cords and a cord guide for guiding the reinforcement cords in a guide plane towards the die, wherein the cord guide includes cord guide members, wherein the extruder head is provided with flow channels which are arranged to debouch, via slits in the cord guide members, into the die, wherein the lower cord guide member and the upper cord member are each provided with an inner body extending on the inside of the lower slit and the upper slit, respectively, and an outer body extending on the outside of the lower slit and the upper slit, respectively, wherein the inner bodies are integrally connected to the respective outer bodies.

22 Claims, 6 Drawing Sheets

(51) Int. Cl.
  *B29C 47/02* (2006.01)
  *B29C 47/08* (2006.01)
  *B29C 47/14* (2006.01)
  *B29D 30/38* (2006.01)
  *B29C 47/06* (2006.01)
  *B29K 105/10* (2006.01)
  *B29K 21/00* (2006.01)
  *B29L 30/00* (2006.01)

(52) U.S. Cl.
  CPC .......... *B29C 47/0822* (2013.01); *B29C 47/14* (2013.01); *B29D 30/38* (2013.01); *B29C 47/0021* (2013.01); *B29C 47/02* (2013.01); *B29C 47/065* (2013.01); *B29C 47/145* (2013.01); *B29D 2030/381* (2013.01); *B29K 2021/00* (2013.01); *B29K 2021/003* (2013.01); *B29K 2105/101* (2013.01); *B29L 2030/003* (2013.01)

(58) Field of Classification Search
  USPC ................. 425/461, 500, 505, 516, 114, 467
  See application file for complete search history.

(56) References Cited

FOREIGN PATENT DOCUMENTS

| | | |
|---|---|---|
| EP | 2 517 854 A1 | 10/2012 |
| FR | 2 463 488 A1 | 2/1981 |
| SU | 1018855 A1 | 5/1983 |
| SU | 1636242 A1 | 3/1991 |

OTHER PUBLICATIONS

Written Opinion of the International Searching Authority issued in PCT/NL2014/050918 dated Mar. 18, 2015 (6 pages).
Russian Search Report issued in SU 2016127537, dated Aug. 14, 2018, 2 pages.

\* cited by examiner

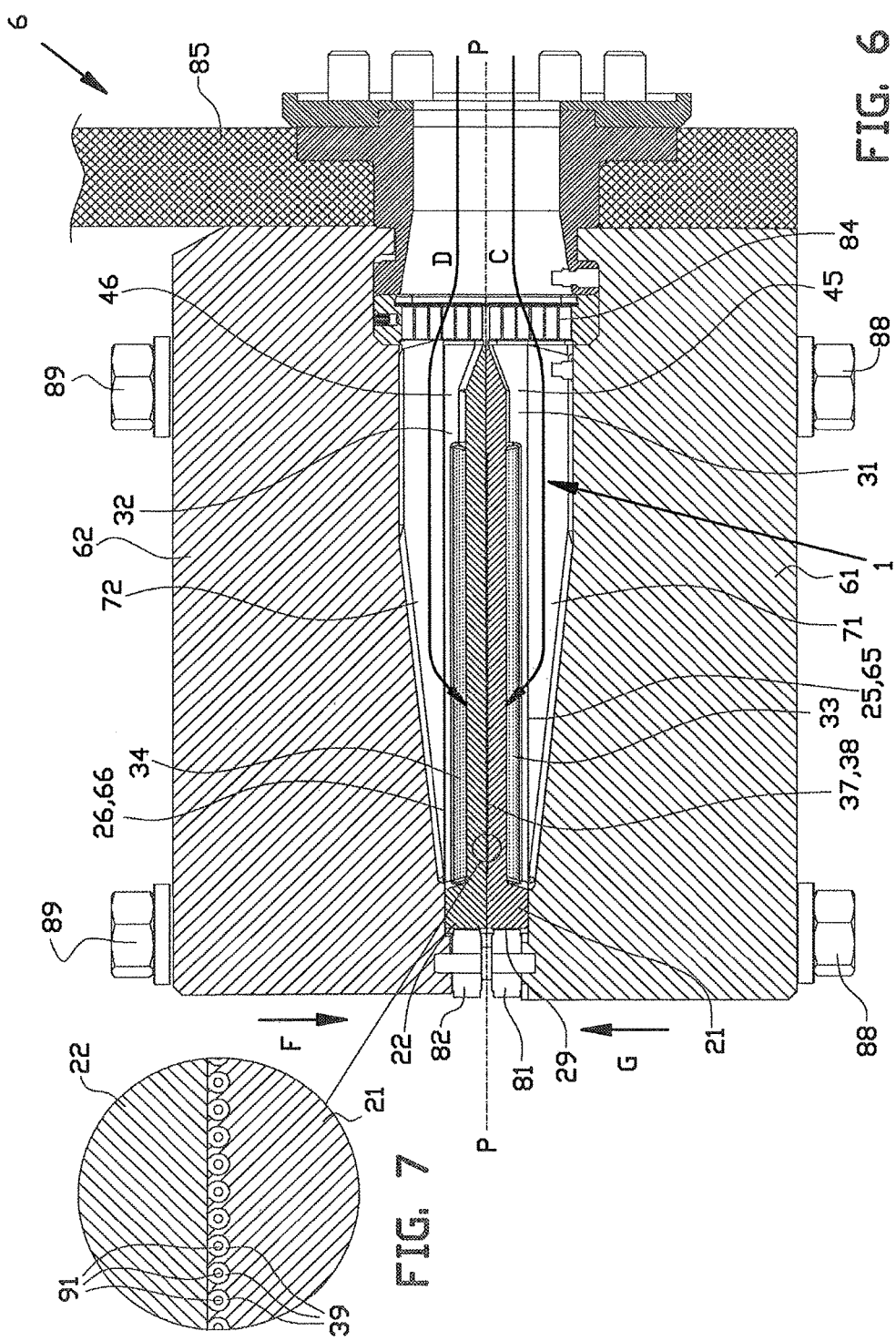

EXTRUDER TOOLING

CROSS REFERENCE TO RELATED APPLICATIONS

This application is the U.S. National Phase Application of PCT/NL2014/050918, filed Dec. 30, 2014, which claims priority to Netherlands Patent Application No. 2012075, filed Jan. 10, 2014, the contents of such applications being incorporated by reference herein.

FIELD OF THE INVENTION

The invention relates to extruder tooling for placement in an extruder head and an extruder device comprising said extruder tooling and said extruder head.

BACKGROUND OF THE INVENTION

EP 0 503 541 A1, which is incorporated by reference, discloses an extruder head defined by a number of superimposed plates and by a casing housing the plates. The plates, when packed together, form an intermediate guide duct for reinforcing wires and two supply ducts for extruded elastomeric material located on opposite sides of the intermediate guide duct. The plates provide for locking together parts of a wire guiding device and a die.

The case housing, the plates and the parts of the wire guiding device and the die need to be aligned accurately, so that the extruded elastomeric material is correctly supplied via the supply ducts to the reinforcing wires that are being guided through the intermediate guide duct. Any misalignment, in particular between the wire guiding device and the die, can cause irregularities in the supply of elastomeric material to the die and the shape, thickness, quality and/or consistency of the extruded strip that leaves the die. Due to the plurality of plates and parts that are superimposed and locked together, the known extruder head is subject to great tolerances. Over time, the plates and parts are subject to wear, thereby further increasing the tolerances. As a result, many dimensions of the extruder head, in particular the dimensions of the supply ducts and the die which are formed by several parts, will become ill defined. Also, assembling and disassembling the many plates and parts is complex and time consuming.

It is an object of the present invention to provide an alternative extruder tooling for placement in an extruder head and extruder device comprising said alternative extruder tooling and an alternative extruder head.

SUMMARY OF THE INVENTION

According to a first aspect, the invention provides extruder tooling for placement in an extruder head and for forming a elastomeric strip with reinforcement cords, wherein the extruder tooling comprises a die for applying elastomeric material to the reinforcement cords and a cord guide for guiding the reinforcement cords in a guide plane towards the die, wherein the cord guide comprises a lower cord guide member and an upper cord guide member which are arranged to be mated with each other on opposite sides of the guide plane with the reinforcement cords extending in between them, wherein the extruder head is provided with a lower flow channel and an upper flow channel which, at one end, are arranged to be in fluid communication with a supply of elastomeric material, and, at the other end, are arranged to debouch, via a lower slit in the lower cord guide member and an upper slit in the upper cord guide member, into the die from opposite sides of the guide plane, wherein the lower cord guide member and the upper cord guide member are each provided with an inner body extending on the inside of the lower slit and the upper slit, respectively, with respect to the guide plane and an outer body extending on the outside of the lower slit and the upper slit, respectively, with respect to the guide plane, wherein the outer bodies at least partially overlap the inner bodies in a direction normal to the guide plane, wherein the inner bodies of the lower cord guide member and the upper cord guide member are integrally connected to the respective outer bodies of the lower cord guide member and the upper cord guide member.

The respective slits can thus be at least partly defined in a single member, thereby reducing the influence of wear or tolerances on the shape and/or dimensions of the slits.

Preferably, the cord guide is arranged for guiding the reinforcement cords in an entry direction towards the die, wherein the lower cord guide member and the upper cord guide member are provided with lower side bodies and upper side bodies, respectively, which, at both ends in a direction transverse to the entry direction, integrally connect the respective inner bodies to the respective outer bodies. The respective slits can thus be at least partly defined in a single, integral member, thereby reducing the influence of wear or tolerances on the shape and/or dimensions of the slits.

Preferably, the inner bodies are provided with oblique inner surfaces which are arranged to taper towards each other from opposite sides of the guide plane into a sharp tip facing into the entry direction.

In an embodiment the lower cord guide member and the upper cord guide member, considered in a direction normal to the guide plane, extend both on the inside and the outside of the lower slit and the upper slit, respectively, with respect to the guide plane. Thus, the dimensions of the respective slits in a direction normal to the guide plane can be at least partly defined in a single member, thereby reducing the influence of wear or tolerances on the shape and/or dimensions of the slits in said direction.

In an embodiment the lower slit and the upper slit, in the circumferential direction thereof, are fully encapsulated by the lower cord guide member and the upper cord guide member, respectively. Thus, the circumference of the respective slits can be at least partly defined in a single member, thereby reducing the influence of wear or tolerances on the shape and/or dimensions of the circumference.

In an embodiment the lower cord guide member and the outer cord guide member are arranged to be placed in direct contact with the die at the respective outer bodies of the cord guide members. The direct contact can minimize tolerances between the cord guide and the die.

In a preferred embodiment the die comprises a lower die member and an upper die member which are arranged to be mated with each other on opposite sides of the guide plane.

In an embodiment thereof the lower die member and the upper die member are connected to the outer bodies of the lower cord guide member and the upper cord guide member, respectively. By connecting the cord guide members to the respective die members, the relative positioning between those respective members can be more accurate. Also, the reinforcement cords can be placed between both the cord guide members and the die members in preparation for the extrusion process, after which preparation the cord guide members and the die members can be placed simultaneously, with the reinforcement cords already inserted, into the extruder head. This can reduce the downtime of the extruder during changing of the extruder tooling.

Preferably, the lower cord guide member and the lower die member are integral and/or form a monoblock, and wherein the upper cord, guide member and the upper die member are integral and/or form a monoblock. In this manner, tolerances between the respective members can be reduced or even eliminated. It can be ensured that the die is always correctly aligned with cord guide.

In an alternative embodiment the outer body of the lower cord guide member and outer body of the upper cord guide member are provided with a lower abutment surface and an upper abutment surface, respectively, wherein the lower die member and the upper die member are arranged to be placed in the extruder head in abutment with the lower abutment surface and the upper abutment surface, respectively. By having separate die members and cord guide members, different types of each set of members can be combined. By presenting the die members and the cord guide members with abutment surfaces, it can still be ensured that the cord guide members and the die members are aligned properly with respect to each other.

In an embodiment the lower abutment surface and the upper abutment surface extend normal to the guide plane. The abutment surfaces thus can present an alignment surfaces for alignment in a direction parallel to the guide plane.

In an embodiment one of the cord guide members is provided with a plurality of parallel guiding grooves for receiving and guiding the reinforcement cords towards the die, wherein at least three quarters of the circumference of the guide grooves is defined by the inner body of the one cord guide member, wherein the remaining circumference is open towards the other cord guide member. The relatively small opening with respect to the rest of the guide grooves can reduce the risk or prevent that the reinforcement cords —after meticulous manual placement of each individual reinforcement cords in a corresponding groove—accidentally pop out of their respective cord guide grooves. In this manner, the reinforcement cords can be securely fitted to their respective cord guide grooves in preparation for the extrusion process.

According to a second aspect, the invention provides an extruder device comprising an extruder head and the extruder tooling according to any one of the preceding claims.

In an embodiment the extruder head is provided with a lower clamping body and an upper clamping body, each provided with a head clamping surface facing inwards with respect to the guide plane for clamping of the extruder tooling from both sides of the guide plane, wherein the lower cord guide member and the upper cord guide member are provided with a lower cord guide clamping surface and an upper cord guide clamping surface, respectively, which are arranged to face outwards with respect to the guide plane towards the respective inwardly facing head clamping surfaces, wherein the die is provided with die clamping surfaces which are arranged to be coplanar with the cord guide clamping surfaces. Thus, the die and the cord guide can be clamped by the same head clamping surface.

In an embodiment the head clamping surfaces are arranged to abut and clamp the cord guide clamping surfaces and the respective coplanar die clamping surfaces at once. As a result, the cord guide and the die can be mutually aligned by clamping only. There is no need for additional adjustment tools for fine-tuning. Also, as the clamping surfaces are subjected to equal wear, the alignment can be ensured even over longer periods of time.

In an embodiment the cord guide clamping surfaces extend parallel to the guide plane. Thus, the clamping forces can be directed normal to the guide plane, thereby reducing the risk of misalignment due to transversal forces.

In an embodiment the clamping bodies are arranged to be moved from a clamping position in which the clamping bodies clamp the extruder tooling, into a release position in which at least one of the clamping bodies is moved away from the other of the clamping bodies, wherein, in the clamping position, the extruder tooling is fixated in the extruder head by the clamping bodies in a direction normal to the guide plane, wherein, in the release position, the extruder tooling is freely removable from the extruder head with respect to the clamping bodies. In this manner, the extruder head can be easily accessed for maintenance, placement or removal of the extruder tooling.

In an embodiment the extruder tooling is arranged to be fixated in a direction normal to the guide plane solely by clamping of the clamping bodies. This may simplify or reduce the actions required to remove the extruder tooling from the extruder head, which is important in view of the extruder downtime during changing of the extruder tooling.

In an embodiment the extruder device is provided with one or more fixation elements which are rotatably and eccentrically mounted with respect to a rotational axis that extends in a direction normal to the guide plane, wherein, in a first rotational position, the one or more fixation elements are arranged to be in clamping abutment with extruder tooling in a direction parallel to the guide plane, for fixation of the extruder tooling in said direction, wherein, in a second rotational position, the one or more fixation elements release the extruder tooling.

In an embodiment the fixation elements are arranged to be manually rotatable between the first rotational position and the second rotational position.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 6 shows a cross section of the extruder head along the line VI-VI in FIG. 4; and FIG. 7 show a detail of the extruder head according to the circle in FIG. 6.

DETAILED DESCRIPTION OF THE INVENTION

Figure 1:
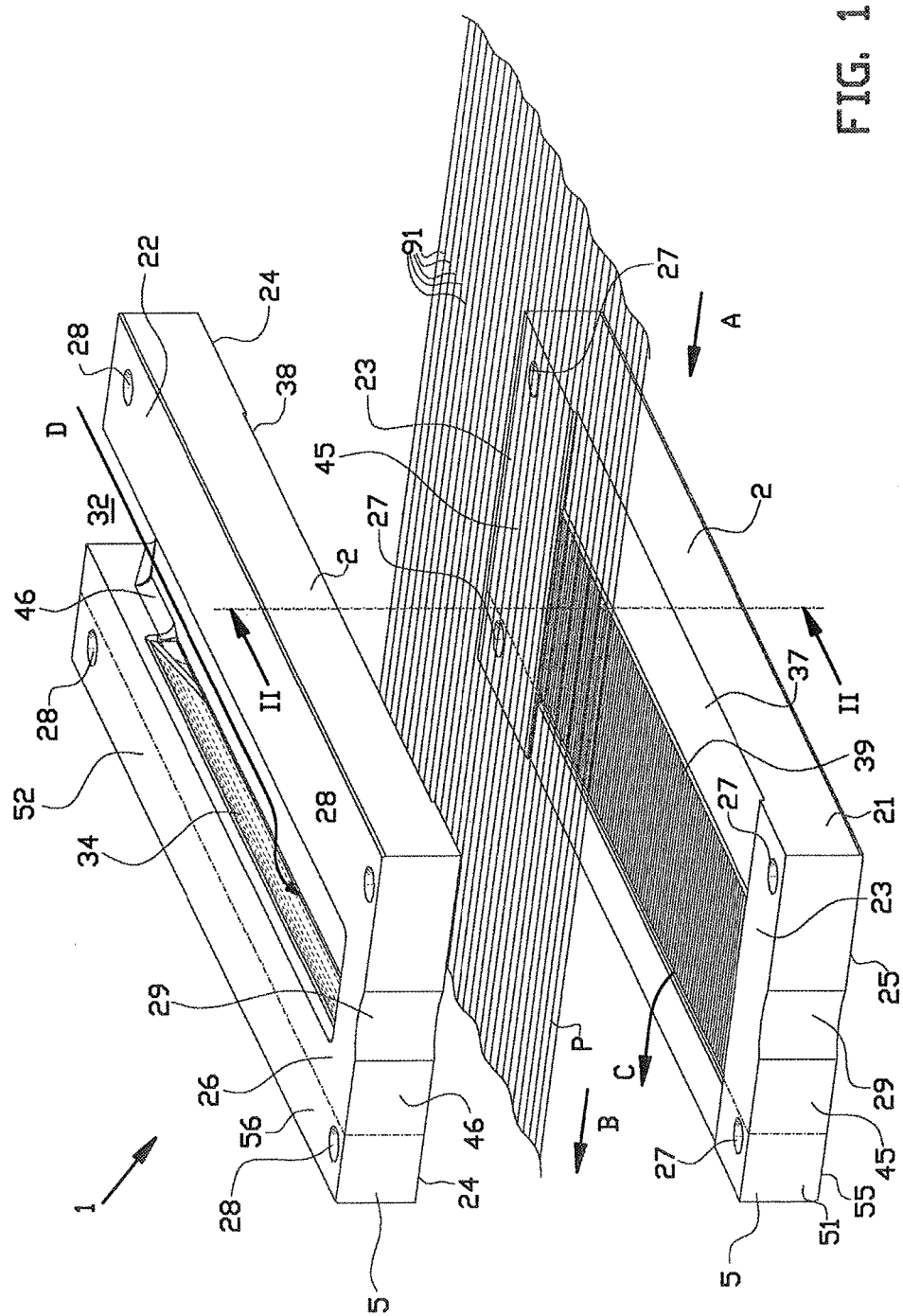
FIG. 1 shows an exploded view in perspective of extruder tooling according to a first embodiment of the invention.
Figure 2:
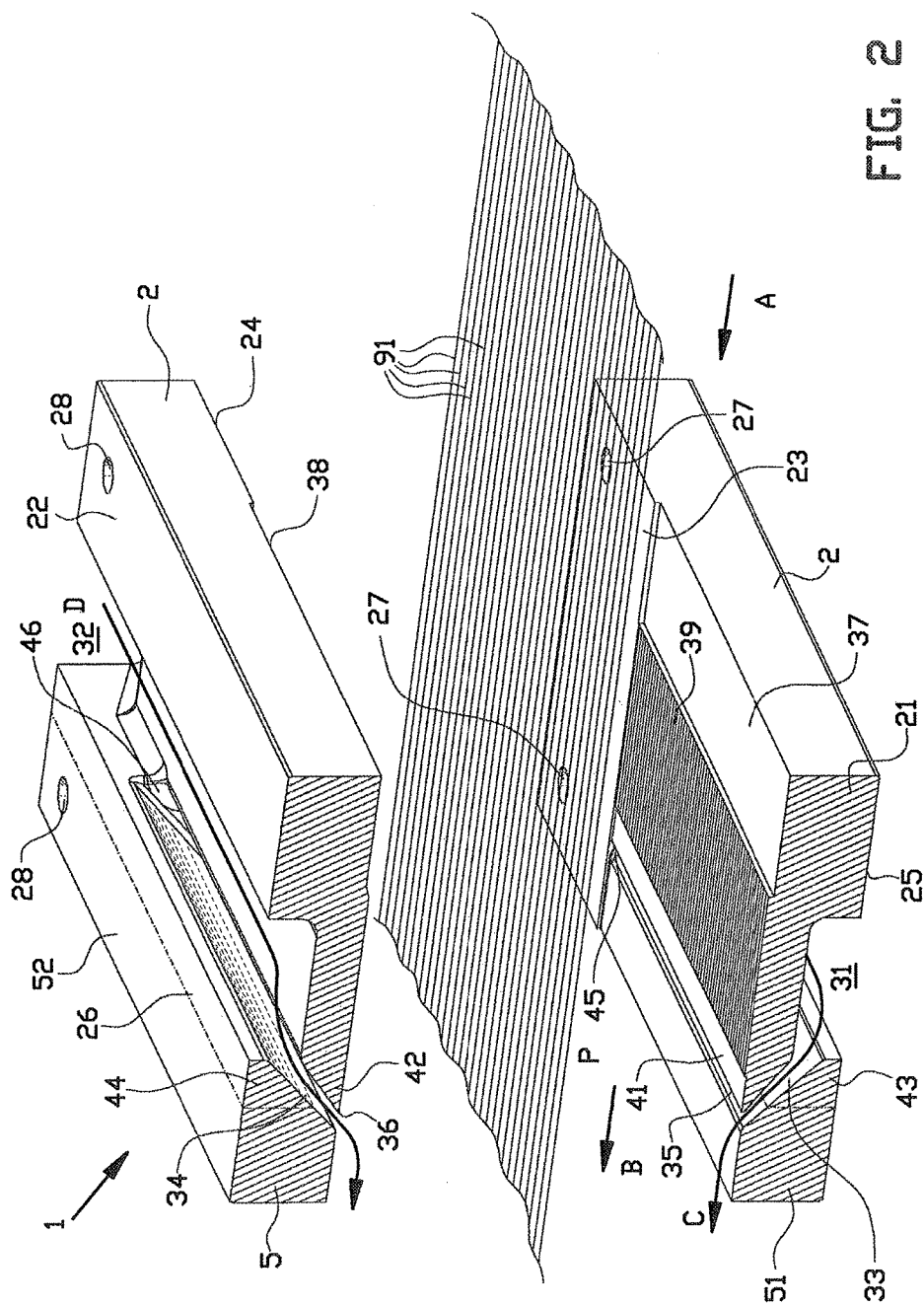
FIG. 2 shows a cross section of the extruder tooling along the line II-II in FIG. 1.
Figure 3:
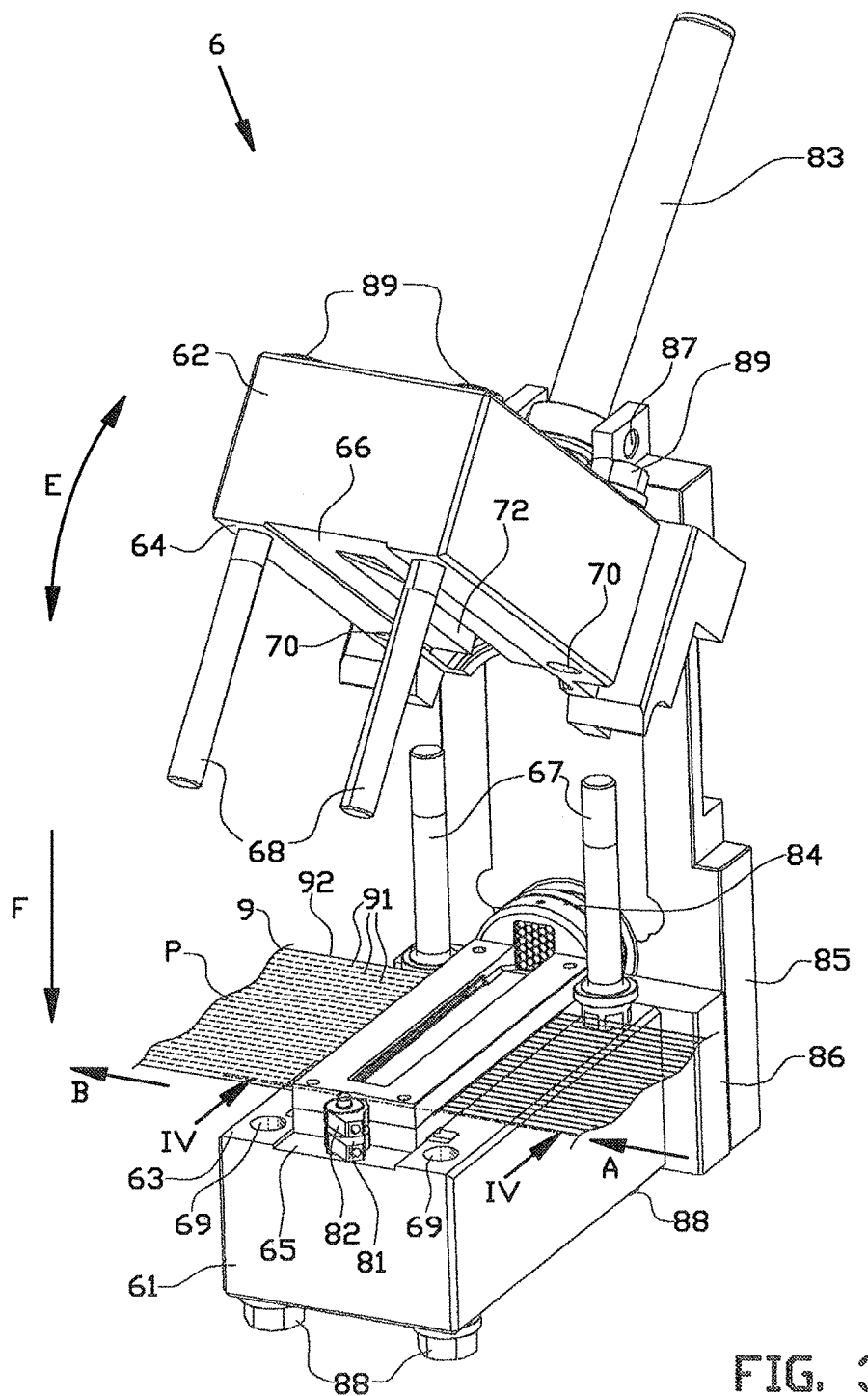
FIG. 3 shows an extruder head, in open condition, for clamping the extruder tooling according to FIGS. 1 and 2.
Figure 4:
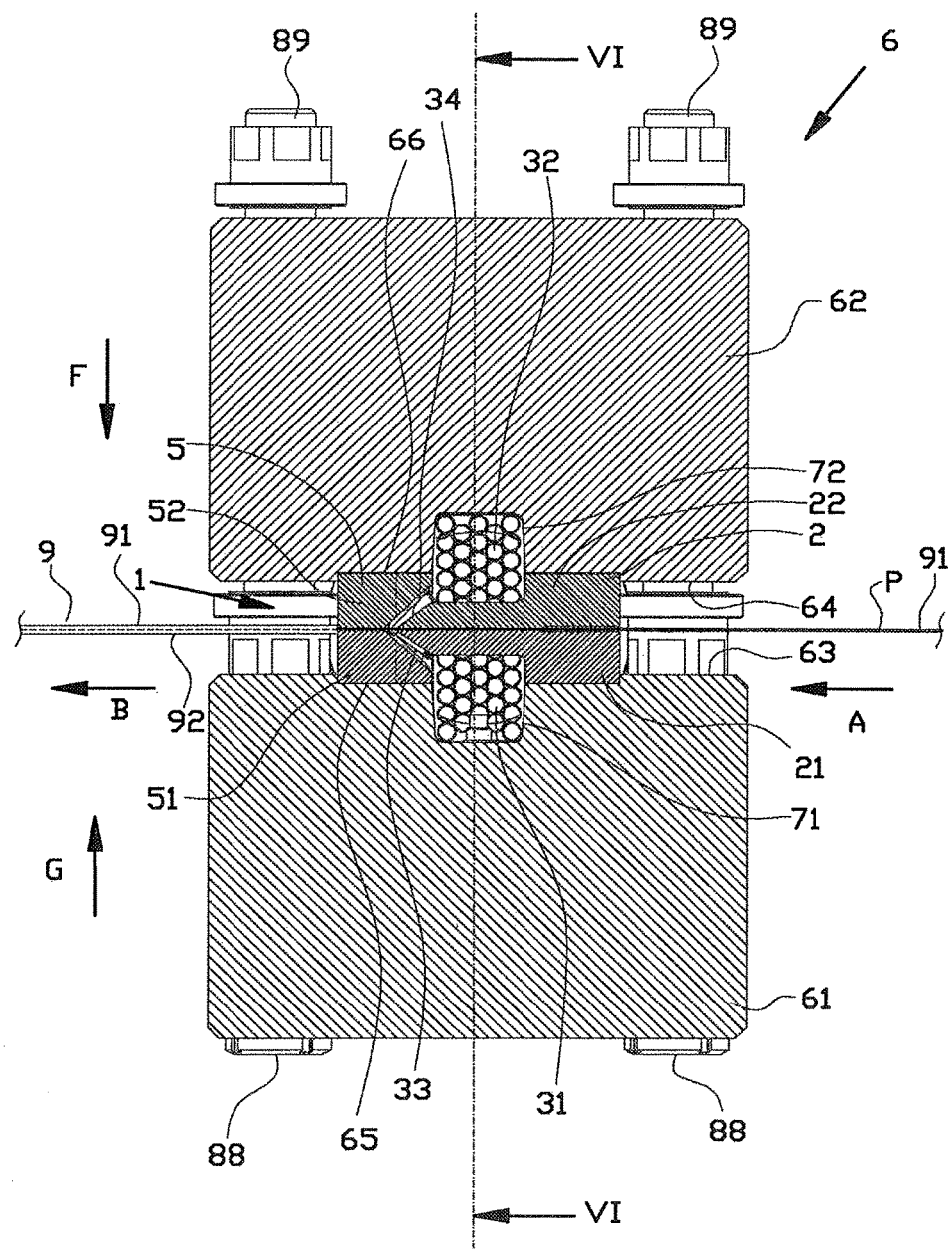
FIG. 4 shows a cross section of the extruder head, in closed condition, along the line IV-IV in FIG. 3.
Figure 5:
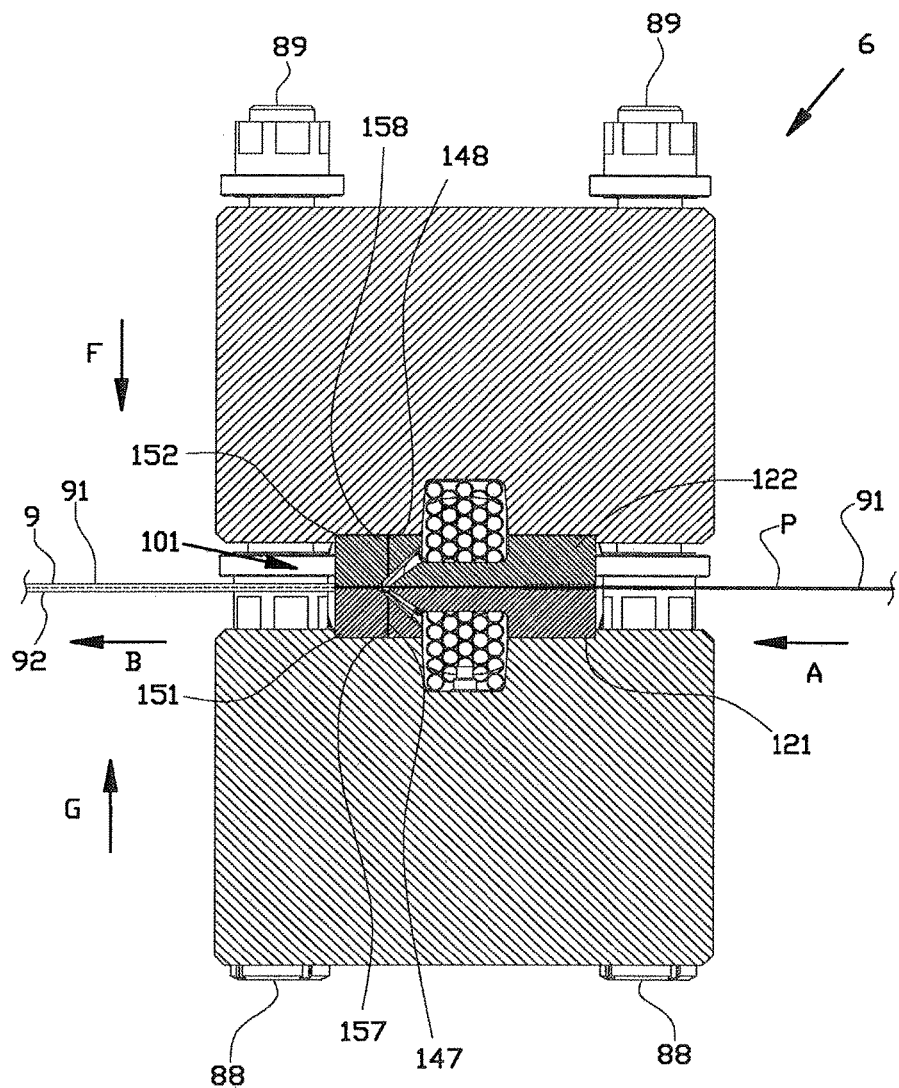
FIG. 5 shows a cross section of alternative extruder tooling according to a second embodiment of the invention, placed in the same extruder head as shown in FIG. 4.

FIGS. 1 and 2 show extruder tooling 1 according to a first exemplary embodiment of the invention, for use or placement in an extruder head 6, as shown in FIGS. 3, 4, 6 and 7. The extruder tooling 1 and the extruder head 6 are part of an extruder device which also comprises an extruder (not shown) for supplying elastomeric or rubber material to the extruder head 6. FIG. 5 shows alternative tooling 101 according to a second exemplary embodiment of the invention, for use or placement in the same extruder head 6 as shown in FIG. 4. Both embodiments of the extruder tooling 1, 101 are arranged for forming a substantially planar elastomeric strip 9 with reinforcement cords 91 embedded in or coated with extruded, elastomeric material 92. The formed elastomeric strip 9 can for example be used for manufacturing cord-reinforced elastomeric components, in particular breaker components, for vehicle tires.

As shown in FIG. 1, the extruder tooling 1 comprises a cord guide 2 and die 5. The cord guide 2 is arranged at the side of the extruder tooling 1 where—in use—the reinforcement cords 91 enter the extruder tooling 1, as indicated by the entry arrow A. The die 5 is arranged at the opposite side of the extruder tooling 1 where—in use—the reinforcement cords 91 embedded in elastomeric material 92, exit the extruder tooling 1, as indicated with exit arrow B. The reinforcement cords 91 are guided by the cord guide 2 towards the die 5 in a guide plane P that is coplanar to the plane of the elastomeric strip 9 that is to be formed by the extruder tooling 1. It is noted that the reinforcements cords 91 in the figures are only shown schematically and their number and spacing is not representative of the actual number and spacing.

The cord guide 2 comprises a lower cord guide member 21 and an upper cord guide member 22. The die 5 comprises a lower die member 51 and an upper die member 52. In this exemplary embodiment, the lower cord guide member 21 and the lower die member 51 are integrally formed, and are thus merely divided by an imaginary plane, as indicated with dashed lines in the figures. Similarly, the upper cord guide member 22 and the upper die member 52 are integrally formed, and are thus also merely divided by an imaginary plane, as indicated with dashed lines in the figures. The lower cord guide member 21 and the lower die member 51 are arranged to be placed as one half of the extruder tooling 1 at one side of the guide plane P, preferably underneath the guide plane P when the guide plane P extends substantially horizontally, while the upper cord guide member 22 and the upper die member 52 are arranged to be placed as the other half of the extruder tooling 1 at the opposite side of the guide plane P, preferably above the guide plane P when the guide plane P extends substantially horizontally.

As shown in FIGS. 4 and 6, the upper cord guide member 22 is arranged to be superimposed or placed on top of the lower cord guide member 21. The lower cord guide member 21 and the upper cord guide member 22, as shown in FIGS. 4 and 6, are provided with a lower mating surface 23 and an upper mating surface 24, respectively, which are arranged to be placed in a mutually facing, abutting relationship. On the respective opposite side of the cord guide members 21, 22 with respect to their mating surfaces 23, 24, the lower cord guide member 21 and the upper cord guide member 22 are provided with a lower cord guide clamping surface 25 and an upper cord guide clamping surface 26, respectively, for secure placement in the extruder head 6 in a manner which will be described in more detail after the detailed description of the extruder head 6. The lower cord guide member 21 and the upper cord guide member 22 are furthermore provided with a plurality of lower alignment bores 27 and corresponding upper alignment bores 28, respectively, which, when mutually aligned, are able to receive locking pins (not shown) for interlocking the cord guide members 21, 22 in a predefined, mutually aligned position. Preferably, the cord guide members 21, 22 are interlocked so as to be substantially mirror symmetrical with respect to the guide plane P. As shown in FIG. 1, the cord guide members 21, 22 each comprises at least one side clamping surface 29 for an even more secure placement in the extruder head 6 in a manner which will be described in more detail after the detailed description of the extruder head 6.

As best shown in FIGS. 2, 4 and 6, the lower cord guide member 21 and the upper cord guide member 22 define at least part of a lower flow channel 31 and an upper flow channel 32, respectively. The flow channels 31, 32 are arranged to be in fluid communication with a sideways supply of elastomeric material 92 from an extruder (not shown) to which the extruder head 6 is to be mounted. The lower flow channel 31 and the upper flow channel 32 are arranged to split a common supply of elastomeric material 92 into a lower flow and an upper flow, as schematically indicated with flow arrows C and D, respectively, in FIG. 6. The lower cord guide member 21 and the upper cord guide member 22 are provided with a lower slit 33 and an upper slit 34, respectively, which define a passageway in the respective cord guide members 21, 22 all the way up to the die 5. The slits 33, 34 form continuations of the respective flow channels 31, 32 and direct the sideways supply of elastomeric material 92 towards the die 5. At the die 5, the lower slit 33 and the upper slit 34 debouch via a lower exit 35 and an upper exit 36, respectively, from opposite sides of the guide plane P into the die 5 in a manner which will be described in more detail after the detailed description of the die 5. It will be apparent to the skilled person that—although the flow arrows C, D only enter the slits 33, 34 and exit the exits 35, 36 at one location—in practice, the elastomeric material 92 will be evenly distributed over and flow through the full cross sectional area of the slits 33, 34 and the exits 35, 36.

The lower cord guide member 21 and the upper cord guide member 22 comprise a lower cord guide recess 37 and an upper cord guide recess 38, respectively, which are recessed with respect to the mating surfaces 23, 24 to define an aperture or intermediate guide duct through which the reinforcement cords 91 can be entered into the extruder tooling 1 in the entry direction A. At least one of the cord guide member 21, 22, and in this preferred embodiment the lower cord guide member 21, is provided with cord guide grooves 39, which, as shown in detail in FIG. 7, are arranged for approximately three quarters of their circumference in the body of the lower cord guide member 21. The remaining quarter of their circumference is open and faces upwards towards the upper cord guide member 22. This allows for each reinforcement cord 91 to be laid into or fitted in a respective cord guide groove 39 from above. The converging edges of the circumference near the opening reduce the risk or prevent that the reinforcement cords 91 —after meticulous manual placement of each individual reinforcement cord 91 in a corresponding groove 39—accidentally pop out of their respective cord guide grooves 39. In this manner, the reinforcement cords 91 can be securely fitted to their respective cord guide grooves 39 in preparation for the extrusion process.

As shown in FIGS. 2 and 4, the lower slit 33 splits the lower cord guide member 21 into an inner body 41 located at the inside of the lower slit 33 with respect to the guide plane P and an outer body 43 located at the outside of the lower slit 33 with respect to the guide plane P. Similarly, the upper slit 34 splits the upper cord guide member 22 into an inner body 42 located at the inside of the upper slit 34 with respect to the guide plane P and an outer body 44 located at the outside of the upper slit 34 with respect to the guide plane P. More in particular, the respective inner bodies 41, 42 are provided with oblique inner surfaces which are arranged to taper towards each other from opposite sides of the guide plane P into a sharp tip, facing into the exit direction B. The oblique inner surfaces define or bound the inside of the slits 33, 34. At the tip, the cord guide 2 debouches into or meets the die 5. The outer bodies 43, 44 are provided with oblique outer surfaces which extend along and opposite to the oblique inner surfaces and define or bound the outside of the slits 33, 34. The outer bodies 43, 44 at least partially, and preferably almost completely overlap the inner bodies 41, 42 when viewed in a direction normal or perpendicular to the guide plane P. As a result, the slits 33, 34 are bound by the cord guide members 21, 22 at the their respective inside and outside with respect to the guide plane P, by the inner body 41, 42 and the outer body 43, 44, respectively.

Furthermore, the lower cord guide member 21 and the upper cord guide member 22 are provided with lower side bodies 45 and upper side bodies 46, respectively, which—at both ends in a direction transverse to the entry direction A—integrally connect the respective inner bodies 41, 42 to the respective outer bodies 43, 44 or integrally connect the inner body 41 of the lower cord guide member 21 and the inner body 42 of the upper cord guide member 22 to the outer body 43 of the lower cord guide member 21 and the outer body 44 of the upper cord guide member 22, respectively. The side bodies 45, 46 define or bound the sides of the respective slits 33, 34 between the respective inner bodies 41, 42 and the respective outer bodies 43, 44. As a result, the slits 34, 34, considered in their circumferential direction substantially perpendicular to the course or the path of the slits 33, 34 through their respective cord guide members 21, 22, are fully encapsulated, surrounded or bound by their respective cord guide members 21, 22 along at least a part of said course or path.

The outer bodies 43, 44 of the respective cord guide members 21, 22 provide or present a means for integral connection of the respective die member 51, 52 directly in front of the cord, guide member 21, 22. By integrally connecting the lower die member 51 to the lower cord guide member 21, and by integrally connecting the upper die member 52 to the upper cord guide member 22, it is possible to accurately position and/or align the die members 51, 52 to their respective cord guide members 21, 22. It also allows for the cord guide 2 and the die 5 to be placed simultaneously in the extruder head 6. Tolerances in a direction normal or perpendicular to the guide plane P can be prevented because the die members 51, 52 and their respective cord guide members 21, 22 are integral.

As shown in FIG. 1, the die members 51, 52 are provided with a lower die clamping surface 55 and an upper die clamping surface 56, respectively, which for a coplanar continuation of the lower cord guide clamping surface 25 and the upper cord guide clamping surface 26, respectively.

As shown in FIG. 5, the alternative extruder tooling 101 is identical to the extruder tooling 1 as shown in FIGS. 1-4 and 6, apart from the lower cord guide member 121 and the lower die member 151 being separate bodies and the upper cord guide member 122 and the upper die member 152 being separate bodies. At the position of the imaginary plane in FIGS. 1 and 2, the alternative extruder tooling 101 of FIG. 5 is provided with actual or physical first abutment surfaces 147, 148 at the outer bodies of the cord guide members 121, 122 facing corresponding opposite second abutment surfaces 157, 158 at the die members 151, 152. During assembly of the alternative extruder tooling 101, the cord guide members 121, 122 and the die members 151, 152 are placed in abutment with their respective abutment surfaces 147, 148, 157, 158.

As shown in FIG. 3, the extruder head 6 comprises a lower clamp body 61 and an upper clamp body 62 between which the extruder tooling 1 can be clamped. Each clamp body 61, 62 is provided with a head clamping surface 63, 64, part of which is slightly recessed to receive and accommodate the extruder tooling 1 in a predetermined position. In particular, the clamp bodies 61, 62 are provided with recessed accommodation surfaces 65, 66 which have the same width, considered parallel to the entry direction A, as the combined cord guide clamping surfaces 25, 26 and the die clamping surfaces 55, 56 of the extruder tooling 1. Because of the minimal tolerance between the extruder tooling 1 and the accommodation surfaces 65, 66, accurate positioning of the extruder tooling 1 parallel to the entry direction A can be ensured. Each of the clamp bodies 61, 62 is provided with pins 67, 68 fitting into corresponding holes 69, 70 of the other of the clamp bodies 61, 62, for proper mutual alignment of the clamp bodies 61, 62 during clamping.

The extruder tooling 1 is arranged to be placed and clamped between the clamp bodies 61, 62 without additional fixation by fixation means that require tools. In this exemplary embodiment, the only fixation of the extruder tooling 1 occurs by the action of two eccentric fixation elements 81, 82, one for each half of the extruder tooling 1, which lock the extruder tooling 1 against the strainer 84.

FIG. 6 shows that the lower clamp body 61 and the upper clamp body 62 define at least partially a lower flow channel 71 and an upper flow channel 72, respectively, cooperating with and in fluid communication with the lower flow channel 31 and the upper flow channel 32, respectively, of the extruder tooling 1.

As shown in FIG. 3, the extruder head 6 comprises a plate-like base 85 that is mounted to an extruder (not shown) to receive a supply of elastomeric material 92. The lower clamp body 61 is mounted to the base 85 via a support block 86, while the upper clamp body 62 is rotatably coupled to the base 85 via hinges 87, so as to be moveable with a handlebar 83 in a direction of rotation E between a clamping position and a release position. In the clamping position, the extruder tooling 1 is clamped in the direction normal or perpendicular to the guide plane P by the clamping action of the clamping bodies 61, 62 only. The clamping force is generated by clamping bolts 88, 89 on opposite sides of the respective clamping bodies 61, 62. In the release position, as shown in FIG. 3, the upper clamp body 62 is moved apart from the lower clamp body 61, such that the lower clamp body 61 is freely accessible to perform placement and removal operations on the extruder tooling 1. Due to the absence of any fixation elements that require tools, the extruder tooling 1 can be easily placed in and removed from the extruder head 6.

In a preferred embodiment, the extruder head 6 is provided with a filter or strainer 84 that is placed in the flow of the supply of elastomeric material between the extruder (not shown) and the extruder tooling 1. The strainer 84 is provided with a mesh that is small enough to catch unwanted particles in the flow of elastomeric material, such that a split die can be prevented. As shown in FIG. 3, the extruder head 6 is provided with fixation elements 81, 82 which are mounted and rotatable about an eccentric rotation axis. The eccentric fixation elements 81, 82 are rotatable between a first rotational position in which the fixation elements 81, 82 are in clamping abutment with the respective halves of the extruder tooling 1 and a second rotational position in which the fixation elements 81, 82 unlocking or releasing of the extruder tooling 1. The clamping abutment acts parallel to the guide plane P in a direction transverse to the entry direction A. In particular, the clamping force of the fixation elements 81, 82 causes the extruder tooling 1 to be forced against the oppositely located strainer 84, thereby ensuring an optimal connecting of the extruder tooling 1 to the strainer 84 and the supply of elastomeric material flowing through said strainer 84. The fixation elements 81, 82 are arranged to be rotated manually, such that no separate tools are required for the removal of the extruder tooling 1 from the extruder head 6.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to extruder tooling for placement in an extruder head and for forming a elastomeric strip with reinforcement cords, wherein the extruder tooling comprises a die for applying elastomeric material to the reinforcement cords and a cord guide for guiding the reinforcement cords in a guide plane towards the die, wherein the cord guide comprises a cord guide members, wherein the extruder head is provided with a flow channels which are arranged to debouch, via slits in the cord guide members, into the die, wherein the lower cord guide member and the upper cord guide member are each provided with an inner body extending on the inside of the lower slit and the upper slit, respectively, and an outer body extending on the outside of the lower slit and the upper slit, respectively, wherein the inner bodies are integrally connected to the respective outer bodies.

The invention claimed is:

1. An extruder tooling for placement in an extruder head and for forming an elastomeric strip with reinforcement cords, wherein the extruder tooling comprises:
    a die for applying elastomeric material to the reinforcement cords; and
    a cord guide for guiding the reinforcement cords in a guide plane towards the die,
    wherein the cord guide comprises:
    a lower cord guide member and an upper cord guide member which are arranged to be mated with each other on opposite sides of the guide plane with the reinforcement cords extending in between them,
    wherein the extruder head is provided with a lower flow channel and an upper flow channel which, at one end, are arranged to be in fluid communication with a supply of elastomeric material, and, at an other end, are arranged to debouch, via a lower slit in the lower cord guide member and an upper slit in the upper cord guide member, into the die from opposite sides of the guide plane,
    wherein the lower slit and the upper slit have an inside with respect to the guide plane and an outside with respect to the guide plane,
    wherein the lower cord guide member and the upper cord guide member are each provided with an inner body extending on the inside of each of the lower slit and the upper slit, respectively, with respect to the guide plane and an outer body extending on the outside of each of the lower slit and the upper slit, respectively, with respect to the guide plane,
    wherein the outer bodies at least partially overlap the inner bodies in a direction normal to the guide plane,
    wherein the inner body and the outer body of the lower cord guide member are integrally connected to form a first single, integral member, and
    wherein the inner body and the outer body of the upper cord guide member are integrally connected to form a second single, integral member.

2. The extruder according to claim 1, wherein the first single, integral member and the second single, integral member are indivisible members.

3. The extruder according to claim 1, wherein the first single, integral member and the second single, integral member are monolithic members or monoblocks.

4. The extruder tooling according to claim 1, wherein the cord guide is arranged for guiding the reinforcement cords in an entry direction towards the die, and
    wherein the lower cord guide member and the upper cord guide member are provided with lower side bodies and upper side bodies, respectively, which, at both ends in a direction transverse to the entry direction, integrally connect the respective inner bodies to the respective outer bodies.

5. The extruder tooling according to claim 1, wherein the inner bodies are provided with oblique inner surfaces which are arranged to taper towards each other from opposite sides of the guide plane into a sharp tip facing into the entry direction.

6. The extruder tooling according to claim 1, wherein the lower cord guide member and the upper cord guide member, considered in a direction normal to the guide plane, extend both on the inside and the outside of the lower slit and the upper slit, respectively, with respect to the guide plane.

7. The extruder tooling according to claim 1, wherein the lower slit and the upper slit, in a circumferential direction substantially perpendicular to a course or a path of the slits through their respective cord guide members, are fully encapsulated by the lower cord guide member and the upper cord guide member, respectively.

8. The extruder tooling according to claim 1, wherein the lower cord guide member and the outer cord guide member are arranged to be placed in direct contact with the die at the respective outer bodies of the cord guide members.

9. The extruder tooling according to claim 1, wherein the die comprises a lower die member and an upper die member which are arranged to be mated with each other on opposite sides of the guide plane.

10. The extruder tooling according to claim 9, wherein the lower die member and the upper die member are connected to the outer bodies of the lower cord guide member and the upper cord guide member, respectively.

11. The extruder tooling according to claim 10, wherein the lower cord guide member and the lower die member are integral and/or form a monoblock, and
    wherein the upper cord guide member and the upper die member are integral and/or form a monoblock.

12. The extruder tooling according to claim 9, wherein the outer body of the lower cord guide member and outer body of the upper cord guide member are provided with a lower abutment surface and an upper abutment surface, respectively, and
    wherein the lower die member and the upper die member are arranged to be placed in the extruder head in abutment with the lower abutment surface and the upper abutment surface, respectively.

13. The extruder tooling according to claim 12, wherein the lower abutment surface and the upper abutment surface extend normal to the guide plane.

14. The extruder tooling according to claim 1, wherein one of the cord guide members is provided with a plurality of parallel guiding grooves for receiving and guiding the reinforcement cords towards the die,
wherein at least three quarters of the circumference of the guide grooves is defined by the inner body of the one cord guide member, and
wherein the remaining circumference is open towards the other cord guide member.

15. An extruder device comprising:
an extruder head; and
extruder tooling for placement in the extruder head and for forming an elastomeric strip with reinforcement cords,
wherein the extruder tooling comprises a die for applying elastomeric material to the reinforcement cords and a cord guide for guiding the reinforcement cords in a guide plane towards the die,
wherein the cord guide comprises a lower cord guide member and an upper cord guide member which are arranged to be mated with each other on opposite sides of the guide plane with the reinforcement cords extending in between them,
wherein the extruder head is provided with a lower flow channel and an upper flow channel which, at one end, are arranged to be in fluid communication with a supply of elastomeric material, and, at an other end, are arranged to debouch, via a lower slit in the lower cord guide member and an upper slit in the upper cord guide member, into the die from opposite sides of the guide plane,
wherein the lower slit and the upper slit have an inside with respect to the guide plane and an outside with respect to the guide plane,
wherein the lower cord guide member and the upper cord guide member are each provided with an inner body extending on the inside of each of the lower slit and the upper slit, respectively, with respect to the guide plane and an outer body extending on the outside of each of the lower slit and the upper slit, respectively, with respect to the guide plane, wherein the outer bodies at least partially overlap the inner bodies in a direction normal to the guide plane, and
wherein the inner body and the outer body of the lower cord guide member are integrally connected to form a first single, integral member and wherein the inner body and the outer body of the upper cord guide member are integrally connected to form a second single, integral member.

16. The extruder device according to claim 15, wherein the extruder head is provided with a lower clamping body and an upper clamping body, each provided with a head clamping surface facing inwards with respect to the guide plane for clamping of the extruder tooling from both sides of the guide plane, and
wherein the lower cord guide member and the upper cord guide member are provided with a lower cord guide clamping surface and an upper cord guide clamping surface, respectively, which are arranged to face outwards with respect to the guide plane towards the respective inwardly facing head clamping surfaces, and
wherein the die is provided with die clamping surfaces which are arranged to be coplanar with the lower cord guide clamping surface and the upper cord guide clamping surface.

17. The extruder device according to claim 16, wherein the head clamping surfaces are arranged to abut and clamp the lower cord guide clamping surface and the upper cord guide clamping surface and the respective coplanar die clamping surfaces at once.

18. The extruder device according to claim 16, wherein the lower cord guide clamping surface and the upper cord guide clamping surface extend parallel to the guide plane.

19. The extruder device according to claim 16, wherein the lower clamping body and the upper clamping body are arranged to be moved from a clamping position in which the lower clamping body and the upper clamping body clamp the extruder tooling, into a release position in which at least one of the lower clamping body and the upper clamping body is moved away from the other of the lower clamping body and the upper clamping body,
wherein, in the clamping position, the extruder tooling is fixated in the extruder head by the lower clamping body and the upper clamping body in a direction normal to the guide plane, and
wherein, in the release position, the extruder tooling is freely removable from the extruder head with respect to the lower clamping body and the upper clamping body.

20. The extruder device according to claim 16, wherein the extruder tooling is arranged to be fixated in a direction normal to the guide plane solely by clamping of the lower clamping body and the upper clamping body.

21. The extruder device according to claim 16, wherein the extruder device is provided with one or more fixation elements which are rotatably and eccentrically mounted with respect to a rotational axis that extends in a direction normal to the guide plane,
wherein, in a first rotational position, the one or more fixation elements are arranged to be in clamping abutment with extruder tooling in a direction parallel to the guide plane, for fixation of the extruder tooling in said direction, and
wherein, in a second rotational position, the one or more fixation elements release the extruder tooling.

22. The extruder device according to claim 21, wherein the fixation elements are arranged to be manually rotatable between the first rotational position and the second rotational position.

* * * * *